Figure 1:
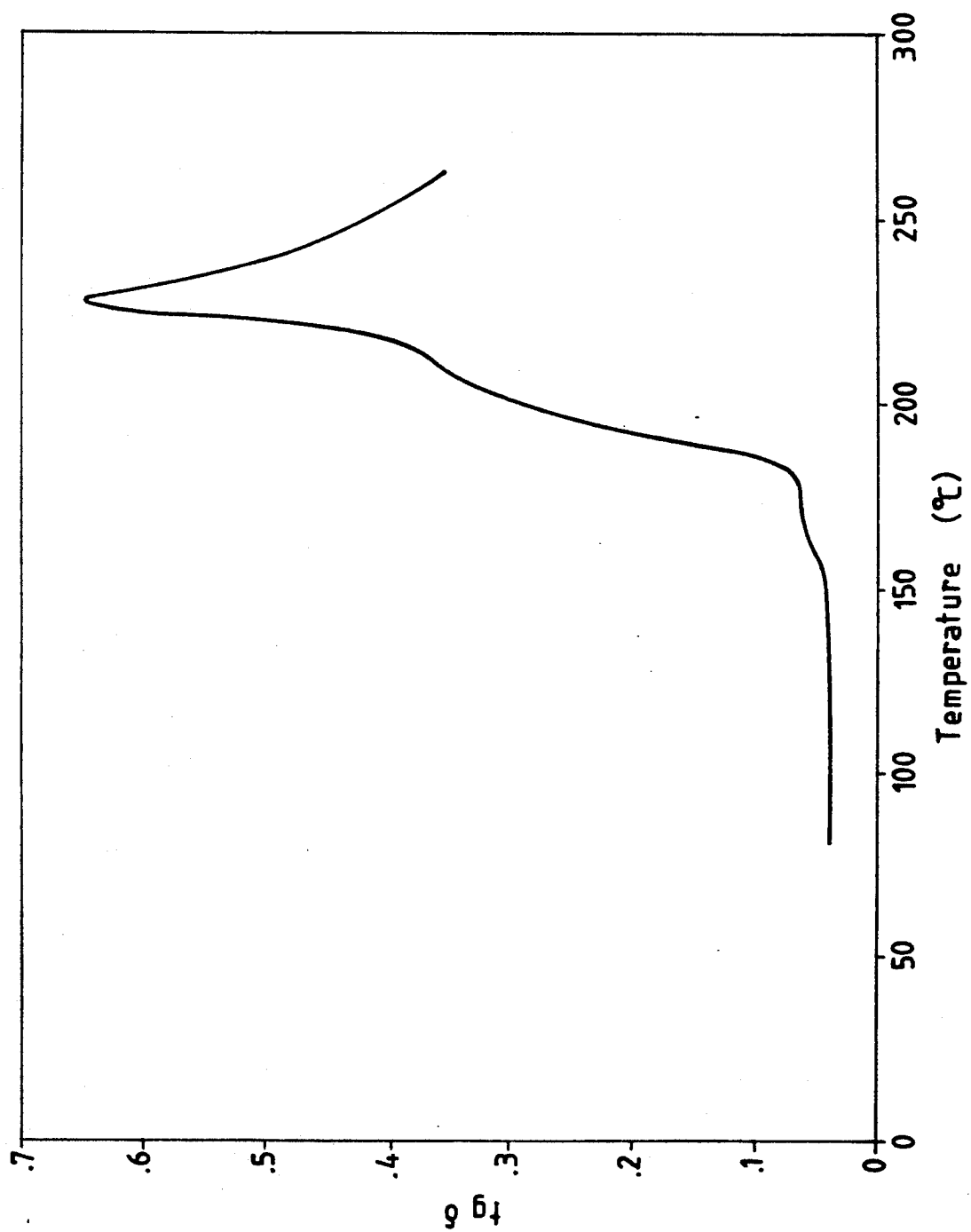

United States Patent [19]

Penco et al.

[11] Patent Number: 5,171,761
[45] Date of Patent: Dec. 15, 1992

[54] CROSS-LINKABLE COMPOSITIONS BASED ON POLYPHENYLENE ETHERS AND UNSATURATED MONOMERS COPOLYMERIZABLE RADICALLY

[75] Inventors: Maurizio Penco, Codogno; Anna M. Villa, Monza; Mario Pegoraro, Segrate; Giuseppe Di Silvestro, Lentate Sul Seveso; Cristina Gobbi; Luciano Gargani, both of San Donato Milanese, all of Italy

[73] Assignee: Enichem S.p.A., Milan, Italy

[21] Appl. No.: 730,562

[22] Filed: Jul. 12, 1991

Related U.S. Application Data

[63] Continuation of Ser. No. 531,844, Jun. 1, 1990, abandoned.

[30] Foreign Application Priority Data

Jun. 2, 1989 [IT] Italy ............................ 20740A/89
Dec. 1, 1989 [IT] Italy ............................ 22565A/89

[51] Int. Cl.$^5$ .................... C08J 3/28; C08F 283/08
[52] U.S. Cl. .................... 522/141; 522/142; 522/145; 525/392; 525/185; 525/186; 525/190
[58] Field of Search .................... 522/141, 142, 145; 525/392, 185, 186, 190

[56] References Cited

U.S. PATENT DOCUMENTS

3,356,761 12/1967 Fox .................... 525/392
4,623,558 11/1986 Lin .................... 522/142

FOREIGN PATENT DOCUMENTS

0366183 5/1990 European Pat. Off.

OTHER PUBLICATIONS

Derwent Abstract, Matshushita Elec. Works, JP-A-63/003946 (Aug. 1, 1988).
Derwent Abstract, Matsushita Elec. Works, JP-A-63/081172 (Dec. 4, 1988).

*Primary Examiner*—Marion E. McCamish
*Assistant Examiner*—Mark A. Chapman
*Attorney, Agent, or Firm*—Shea & Gould

[57] ABSTRACT

Toughenable polymer compositions cross-linkable thermally or by the effect of U.V. radiation are composed of:

1) A polyphenylene ether (PPE) deriving from the (co)polymerization of one or more substituted phenols by oxidative coupling;
2) At least one mono-unsaturated monomer compound able to (co)polymerize in the presence of radical initiators;
3) Optionally, at least one polyunsaturated monomer compound able to (co)polymerize in the presence of radical initiators;
4) At least one radical polymerization initiator;
5) Possibly at least one (co)polymer with elastomeric characteristics;
6) Usual additives, stabilizers, accelerators and flame retardant agents.

Finished articles essentially composed of an intimately copenetrated polymer blend are obtained by thermal treatment or U.V. radiation of these compositions contained in suitable moulds either along or in combination with other reinforcement materials.

24 Claims, 10 Drawing Sheets

CROSS-LINKABLE COMPOSITIONS BASED ON POLYPHENYLENE ETHERS AND UNSATURATED MONOMERS COPOLYMERIZABLE RADICALLY

This application is a continuation of Ser. No. 531,844, filed Jun. 1, 1990, now abandoned.

The present invention relates to toughenable cross-linkable polymer compositions based on polyphenylene ether (PEE) and unsaturated monomers (co)polymerizable radically, possibly together with (co)polymers with elastomer characteristics, and to the resins obtained thereby after thermal or U.V. treatment. Such compositions are directly usable in the production of manufactured articles of any required shape and size, by cross-linking them after they have been poured or injected into suitable moulds.

The resins obtained by thermal or U.V. cross-linking of such polymer compositions are characterised by possessing not only a high glass transition temperature (Tg), but also an exceptional dimensional stability up to temperatures close to the Tg and excellent adhesion to metal supports. A high Tg is also a known special characteristic of polyphenylene ether (PPE) as such.

This property is however not immediately utilizable because the well known high viscosity of PPE in its molten state together with the consequent high working temperatures and high level of susceptibility to thermal oxidation mean that PPE is difficult to work on its own. In this respect, at the high temperatures required to obtain a certain workability of the polymer, undesirable oxidation processes frequently intervene as shown by partial cross-linking and gelling, with browning of the polymer material.

It is known that these problems have been partly solved by mixing PPE with thermoplastic styrene polymers because of the perfect compatibility between the two resins.

Such compositions are claimed in numerous patents such as U.S. Pat. Nos. 3,356,761, 3,373,226, GB 1,125,620, SU 269,052 and U.S. Pat. No. 3,639,506.

With such systems a greater thermo-oxidative stability is obtained together with improved workability, however the Tg of the system suffers a considerable decrease.

A description of the variation in the Tg of such blends as a function of the relative composition is given in "Polymer Eng. and Sci. 17(3), 213-219 (1977)".

In addition the articles obtained from such mixtures possess insufficient dimensional stability and creep resistance when under the particularly severe conditions of use such as those increasingly demanded by manufacturing industries.

The development of polymer materials possessing a high glass transition temperature, rigidity, dimensional stability and creep resistance is justified by the considerable increase in the possibilities for using them in the industrial field, particularly in the automotive and domestic appliance fields in which an ever increasing quantity of metal parts is being replaced by high-performance polymers.

In the recent U.S. patent application No. 427,721 the applicant describes polymer compositions able, by radical polymerization of the monomers present and simultaneous cross-linking of the growing macromolecules, to produce perfect polymer blends between polyphenylene ether and cross-linked vinylaromatic polymers (polyesters and/or the like) characterised by a very high glass transition temperature (Tg≧180° C.) and considerable dimensional stability, in addition to perfect transparency of the resultant manufactured articles.

According to this invention the polyphenylene ether is treated with styrene and other mono-unsaturated or polyunsaturated vinylaromatic monomers, until total or partial solubilization thereof is attained, and after adding the radical polymerization initiator, a possible accelerator and the usual additives for such compositions it is subjected to thermal or U.V. treatment. In this manner perfect transparent polymer blends with the aforesaid characteristics are obtained, consisting of two polymer matrices of which the vinylaromatic matrix is cross-linked.

It has now been surprisingly found that by treating at least one polyphenylene ether from those specified hereinafter with at least one mono-unsaturated monomer pertaining to those vinyl and acrylic monomer classes able to produce (co)polymers in the presence of radical initiators and at least one polyunsaturated monomer, polymer compositions are obtained which can be transformed into polymer blends characterise by a high Tg and a considerable dimensional stability.

In accordance therewith the present invention relates firstly to new cross-linkable polymer compositions based on polyphenylene ether (PPE) and comprising essentially:

a) from 10 to 90% by weight of at least one polyphenylene ether;

b) from 10 to 90% by weight of a mixture of mono-unsaturated monomers consisting essentially of:

b1) from 1 to 99% by weight of at least one mono-unsaturated vinylaromatic monomer;

b2) from 0 to 99% by weight of at least one vinyl and/or (meth)acrylic monomer able to (co)polymerize radically;

b3) from 0 to 99% by weight of at least one cyclic anhydride or at least one cyclic dianhydride containing unsaturations able to (co)polymerize radically with the monomers b1 and b2;

b4) from 0 to 99% by weight of an unsaturated compound deriving from the reaction between a unsaturated cyclic anhydride or dianhydride and, respectively, an alcohol, ammonia, a primary or secondary amine, or water;

c) from 1 to 80% by weight of a polyunsaturated monomer;

d) from 0.01 to 10% of one or more generators of radicals able to promote the thermal and/or U.V. polymerization of the monomers of steps b and c;

e) possibly, from 1 to 30% by weight (and preferably from 1 to 15% by weight) of at least one copolymer of elastomer character;

f) usual additives, accelerators, stabilizers and flame retardants.

FIGS. 1-6 represents examples of the present invention by plotting tgδ against temperature evaluated by The Rheovibron dynamic-mechanical method, and FIGS. 7-17 present a TEM micrograph of the morphology of the present invention.

As stated, polyphenylene ethers are the only polymer material contained in the compositions of the present invention. Polyphenylene ethers (PPE) are compounds which have been known for a considerable time. They are describe in numerous patents and are generally obtained by oxidative coupling, in the presence of a suitable catalyst, of one or more alkylphenols of which that most widely used is 2,6-dimethylphenol. They have the general formula:

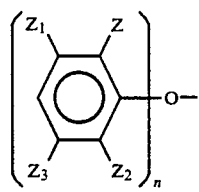
(I)

where Z, $Z_1$, $Z_2$, $Z_3$ are independently chosen from the group consisting of hydrogen, chlorine, bromine, fluorine, $C_1$-$C_4$ alkyl or substituted alkyl, and n is the total number of monomer units, being a whole number greater than 10.

Non-limiting examples of PPEs which can be used in the production of the polymer compositions of the present invention and of the corresponding articles obtained by their cross-linking are:
poly(2,6-dimethyl-1,4-phenylene ether)
poly(2,6-diethyl-1,4-phenylene ether)
poly(2-methyl-6-ethyl-1,4-phenylene ether)
poly(2-methyl-6-propyl-1,4-phenylene ether)
poly(2,6-dipropyl-1,4-phenylene ether)
poly(2,3,6-trimethyl-1,4-phenylene ether)
poly(2-chloro-1,4-phenylene ether)
poly(2-bromo-1,4-phenylene ether)
poly(2-phenyl-1,4-phenylene ether)
poly(2-chloro-6-bromo-1,4-phenylene ether)
poly(2,6-dichloro-1,4-phenylene ether)

The PPE preferably used for the purposes of the present invention is poly(2,6-dimethyl-1,4-phenylene ether) PPEs obtained by oxidative coupling of two or more different phenols are equally suitable for the purposes of the present invention. Generally in these copolymers one of the two or more monomer components is 2,6-dimethylphenol.

Equally suitable for the purposes of the present invention are polyphenylene ethers corresponding to the following general formulas:

experts of the art and are described for example in Die Makromolekulare Chemie 186, 1835–1853 (1985).

The most well known of the PPEs corresponding to formula II is the copolymer obtained from tetramethylbisphenol A and 2,6-dimethylphenol. A non-limiting example of a PPE corresponding to general formula III is the copolymer obtained from tetramethyldiphenylenediol and 2,6-dimethylphenol.

By the mono-unsaturated vinylaromatic monomer component (component b1 of the polymer compositions of the present invention) is meant at least one iso-alkenyl compound from those of general formula

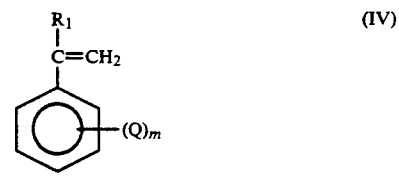
(IV)

where $R_1$ is hydrogen or a $C_1$-$C_4$ alkyl radical; Q is hydrogen, a halogen, a linear or branched $C_1$-$C_4$ alkyl or —$OCH_3$; m is a whole number between 1 and 5.

Examples of monomer compounds corresponding to general formula (II) which are non-limiting for the purposes of the invention are styrene, alphamethylstyrene, ethylstyrene, alphabromostyrene, alphachlorostyrene, vinyltoluene, vinylxylenes etc.

Examples of unsaturated vinyl monomers which are non-limiting for the purposes of the present invention are vinylacetate, vinyl pivalate, vinyl propionate, vinyl versatate and vinyl pyrrolidone. The monomers of (meth)acrylic type (component b2 of the polymer mixture able to (co)polymerize radically) can be represented by the general formula (V):

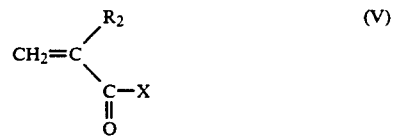
(V)

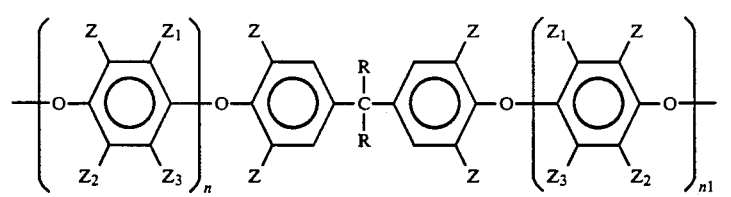
(II)

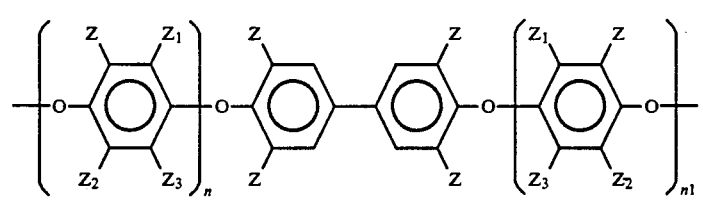
(III)

where Z, $Z_1$, $Z_2$, $Z_3$ and n have the same meanings as in the preceding formula (I), n and n1 are whole numbers independent of each other and having a value greater than 10, and R is hydrogen or a $C_1$-$C_4$ alkyl radical.

The synthesis methods for the polyphenylene ethers corresponding to formulas II and III are well known to where $R_2$ represents a hydrogen atom or a methyl radical; X represents, independently, a hydroxyl radical, an $OR_3$ alkoxy radical where $R_3$ indicates a $C_1$-$C_{20}$ linear or branched chain, a glycidyl group, a polyoxyethylene chain (—$CH_2CH_2O$—)$_n CH_2CH_2OR_4$ where n is a whole number between 0 and 20 and $R_4$ is hydrogen, a methyl radical or an amide group.

Examples non-limiting for the purposes of the present invention include the following compounds: acrylic and methacrylic acid, methyl-, ethyl-, butyl-acrylate and methacrylate, -laurylacrylate and methacrylate, glycidylacrylate and methacrylate, tetraethyleneglycol-monomethylether acrylic and methacrylic ester, acrylamide and methacrylamide.

Examples of unsaturated cyclic anhydrides or dianhydrides non-limiting for the purposes of the present invention and which are able to copolymerize radically with the other monomers present in the mixture (components b1 and b2) include the following compounds: anhydrides deriving from β-unsaturated dicarboxylic acids such as itaconic and citraconic anhydrides, and the following anhydrides:

cis-5-norbornene-endo-2,3-dicarboxylic anhydride:

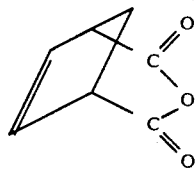
(IV)

cis-1,2,3,6-tetrahydrophthalic anhydride:

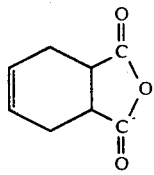
(VII)

bicyclo[2,2,2]-oct-7-ene-2,3,5,6-tetracarboxylic dianhydride:

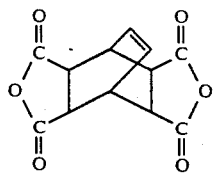
(VIII)

endo-bicyclo[2,2,2]-oct-5-ene-2,3-dicarboxylic anhydride:

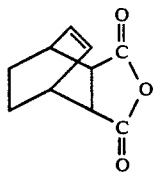
(IX)

maleic anhydride:

(X)

and 4-vinylphthalic anhydride:

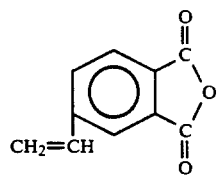
(XI)

Non-limiting examples of compounds pertaining to class b4 include derivatives of unsaturated cyclic anhydrides, diethyl maleate, monoethylmaleate, and monoamides, diamides and imides obtained by reacting unsaturated cyclic anhydrides with ammonia or a primary amine.

As polyunsaturated monomers (component c of the polymer mixtures of the invention) able to generate a polymer cross-linkage responsible for the exceptional characteristics of the articles obtained from the polymer mixtures of the invention, polyfunctional monomers pertaining to the following categories can be used:

1) Polyunsaturated aromatic vinyl monomers of general formula:

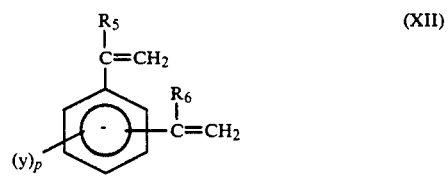
(XII)

where y is hydrogen, a halogen, a linear or branched $C_1$-$C_4$ alkyl, $-OCH_3$ or

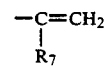

$R_5$, $R_6$, $R_7$ can be, independently of each other, hydrogen or a $C_1$-$C_4$ alkyl radical; p is a whole number between 1 and 4.

The most significant examples of such monomers are divinylbenzene and trivinylbenzene.

2) Polyunsaturated (meth)acrylic monomers. These are generally obtained by esterification of a polyvalent alcohol with (meth)acrylic acid. They have the general formula:

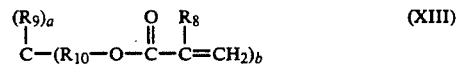
(XIII)

where $R_8$ represents a hydrogen atom or a methyl radical; $R_9$ represents a hydrogen atom or a linear or branched $C_1$-$C_{10}$ alkyl radical; $R_{10}$ represents a $C_1$-$C_3$ linear alkyl biradical; a and b are two numbers such that $a+b=4$ and $b \geq 2$.

The following polyunsaturated monomers are included in this formula: pentaerythritol tetraacrylate, pentaerythritol tetramethacrylate, 1,1,1-trimethylolpropane triacrylate.

3) Polyunsaturated monomers containing two or more phenylene maleimidic groups are also suitable for the purpose. These have the general formula:

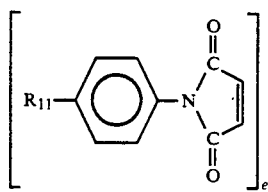

where $R_{11}$ represents an aliphatic, aromatic or alkylaromatic multiple radical and e is a whole number $\geq 2$. More particularly, the group of monomers corresponding to general formula (XV) include monomers of type:

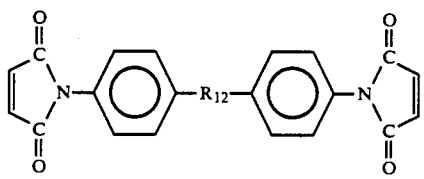

where $R_{12}$ is a $C_1$–$C_{12}$ linear or branched aliphatic or cycloaliphatic biradical.

The rubber component (component e) of the mixtures described in the present invention consists of one or more elastomeric (co)polymers pertaining to one of the following groups: polybutadiene, polyisoprene, styrene-diene copolymers containing up to 50% of styrene, acrylic rubbers, nitrile rubbers, butyl rubbers, olefinic rubbers such as EPDM and EPR, and styrene-ethylene-butene copolymers with a styrene content of up to 50%. non-limiting examples of such rubbers are styrene-butadiene linear and star block copolymers, acrylonitrile-butadiene-styrene (ABS) graft polymer, methylmethacrylate-acrylonitrile-butadiene-styrene (MABS) copolymer and the like.

To obtain the results of the invention it is necessary to also add to the reaction mass (consisting of PPE, at least one elastomeric (co)polymer, at least one mono-unsaturated reactive monomer and a cross-linking agent comprising at least one polyunsaturated reactive monomer) small quantities of an initiator which promotes the radical polymerization of the monomers, with simultaneous cross-linking of the polymerization mass by virtue of the polyunsaturated monomers.

If the polymerization and cross-linking of the mass are to be effected in the traditional manner, a small quantity of an organic peroxide of between 0.01 and 10% with respect to the previously described component b added to the mass before its use is sufficient for this purpose. The choice of initiator obviously depends on the temperatures and times involved in the working and moulding of the polymer composition for the purpose of forming the desired articles.

Suitable to this purpose are in any event all peroxides and hydroperoxides and all those radical generators which can be dissolved or dispersed in the polymer mixture. Typical examples of such initiators are:

dialkylperoxides such as di-tert-butylperoxide and dicumylperoxide;

dialkylperoxides such as benzoylperoxide, diacetylperoxide, bis(2,4-dichlorobenzoyl)peroxide, dilauroylperoxide, bis(3,5,5-trimethylhexanoyl)peroxide, dipropionylperoxide, dioctanoylperoxide, decanoylperoxide etc.

peresters such as tert-butyl-perbenzoate, tert-butylpivalate, tert-butyl-peroctoate, tert-butylperacetate;

peracetates such as 2,2-bis(tert-butylperoxy)-butane;

peroxycarbonates such as cyclohexylperoxycarbonate, bis(2-ethylhexyl)-peroxycarbonate, di-n-butylperoxycarbonate, diisopropylperoxycarbonate etc.;

azo compounds and azobisisobutyronitrile, and in addition cyclohexane peroxide, methylethylketone peroxide and acetone peroxide.

These initiators can be used either alone or in combination with suitable accelerators such as aromatic amines, cobalt or vanadium organic salts etc.

The possibility of choosing and gauging the combination of the aforesaid initiators and the most suitable accelerators makes it possible, in forming the desired articles, to process the compositions of the present invention within a wide temperature range starting from values close to ambient and extending up to 300° C. If on the other hand it is desired to effect the cross-linking polymerization of the polymer composition of the present invention at low temperature by means of ultraviolet radiation, it is a good rule to add a small quantity of an organic photoinitiator, of generally between 0,01 and 10 parts by weight of the total monomers (components b+c) to the mass to be transformed.

Organic photoinitiators useful for this purpose are all those compounds soluble or dispersable in the polymer compositions of the present invention and able to generate free radicals under the action of ultraviolet radiation.

Examples of the application of such polymerization methods are reported in the following publications: J.A.C.S. 77, 494 (1955); Trans. Faraday Soc. 50, 73 (1954).

Non-limiting examples of organic photoinitiators are: benzildimethyl-ketal, 2-hydroxy-2-methyl-1-phenyl-propanone-1, thioxanthone and generally the benzoin esters.

The photoinitiator is preferably present in a quantity of between 1 and 3% by weight with respect to the total monomers (components b+c). It acts both in the presence and in the absence of the aforesaid peroxide component, although the simultaneous presence of this latter is preferred.

If articles with self-extinguishing properties are required, flame retardants such as an organic phosphate can be added to the polymer compositions of the present invention, together optionally with a halogenated compound, this latter acting with synergic effect on the phosphate.

Non-limiting examples of organic phosphates are triphenylphosphate, tritoluylphosphate, dibutylphenylphosphate, trinonylphenylphosphate, tricresylphosphate etc.

The halogenated compound can for example be hexabromobenzene, tetrabromobutane, pentabromotoluene, decachlorodiphenyl, decabromodiphenyl, tetrabromophthalic anhydride etc.

If complete non-flammability of the articles is desired, a further complementary addition of antimony trioxide can be made. The polymer compositions of the present invention can also contain the usual additives such as various minerals and fillers, glass fibres, pigment, stabilizers, flame retardants, plasticizers, lubricants, antistatic agents etc.

The individual components of the mixtures of the present invention are generally mixed together in a suitable mixer such as a Brabender or Banbury mixer at a temperature and for a time dependent on the individual components present, and well known to the expert of the art. The initiator is preferably added at the end of mixing to prevent early decomposition.

The mass thus obtained can be moulded in a compression press or injected into a mould, depending on the fluidity of the system at the working temperature. A curing cycle then follows by heating the mould and keeping the material under pressure, followed by a cooling cycle. Typical operating conditions, which depend on the nature of the components and the initiator, are given in the examples which follow. The polymer blends obtained by thermal or U.V. polymerization of the polymer compositions of the present invention are characterised by glass transition temperatures (Tg) which are compatible with those of the previously mentioned systems based on PPE and vinylaromatic monomers, but with improved engineering properties. They are further characterised by considerable adhesion to metallic surfaces.

The large number of monomers which can be used, many of which in addition to the unsaturations required for their (co)polymerization and cross-linking also contain polar functional groups such as glycidyl, amino, nitrile, carboxyl, ester and anhydride groups, means that a a wide range of polymer blends can be synthesized all characterised by possessing the two aforesaid special properties, i.e. a high Tg and dimensional stability under hot conditions, but which differ from each other by their surface appearance, electrical and mechanical properties, resistance to solvents, coatability, transparency etc.

It is therefore possible to construct polymer blends to specification, based on the type of application and market requirements.

As in the case of the compositions described in the preceding U.S. patent application (U.S. patent application No. 427,721), the polymer compositions according to the present invention also differ from the known art in that the PPE is the only polymer present, the other polymers being formed during the production of the desired articles, by thermal or U.V. treatment of the composition. The use of polymer compositions of the present invention therefore dispenses with the need to mix polyphenyl with other polymers in their molten state, thus avoiding the problems involving polymer stability and modification characteristics of the known art.

In particular, the compatibility between the polyphenylene ether and the resultant cross-linked copolymers after radical polymerization of the present compositions is equal to or better than that obtainable by mixing PPE in the molten state with the corresponding thermoplastic copolymers obtained by polymerizing in like proportions the mono-unsaturated monomers pertaining to the component b) categories of the present invention.

The polymer blends obtained after thermal or U.V. treatment of the compositions according to the present invention, and also representing an aspect of the invention itself, can be used for all applications in which resins with high thermal characteristics are used.

One of the most usual applications is the production of electronic components, such as supports for printed circuits, for which materials are required having high dimensional stability under hot conditions and good thermal properties in addition to the high insulation properties typical of polymer materials.

As stated, they can also be used in the automotive field in which there is a prevailing tendency to replace an increasingly greater quantity of metal parts with polymers of similar characteristics. Again in this case, resins are required having high dimensional stability under hot conditions to allow them to be painted on the production line with the vehicle body. They are also applicable to the domestic electrical appliances field in which they can even replace moving mechanical parts such as toothed gears and pulleys, which are generally of metal construction.

These compositions also possess special properties after cross-linking, such as high adhesion to metal.

The experimental examples described hereinafter are given as non-limiting illustration of the invention.

EXAMPLE 1

50 parts (meaning parts by weight throughout the examples) of poly(2,6-dimethyl-1,4-phenyleneoxide) having an intrinsic viscosity of 0.54 dl/g (known as PPE in the following examples) and 50 parts of a mixture consisting of 37.2 parts of styrene monomer, one part of maleic anhydride (equivalent to 2% on the monomers) and 11.8 parts of a 50/50 w/w mixture of ethylvinylbenzene and divinylbenzene (equivalent to 10 mol % of divinylbenzene on the monomers) were fed into a mechanical mixer. After mixing for 10 minutes at a stirring rate of 80 r.p.m., t=50°-80° C., the system was cooled to 49° C. and the stirring rate reduced to 20 r.p.m.

1% by weight (with respect to the monomers) of tert-butyl perbenzoate was then added.

After the peroxide addition was complete the mixture was kept stirring for 2 minutes at a rate of 60 r.p.m. while maintaining the temperature below 60° C.

The product of the mixing was then subjected to reactive moulding in a compression press, under the following test conditions:
a) isothermal at 120° C. for 15 minutes
b) increase from 120° to 200° C. (rate 5° C./minute)
c) isothermal at 200° C. for 15 minutes;
d) rapid cooling (applied pressure=16 kg/cm$^2$)

The composition and the Tg of the resultant material, determined by DSC, are shown in the accompanying Table 1.

The curve of tan δ against temperature, evaluated by the Rheovibron dynamic-mechanical method (frequency 11 Hz) is shown in FIG. 1.

Table 1 also shows the Tg of the material as evaluated by the Rheovibron dynamic-mechanical method at a frequency of 11 Hz. The Tg is represented by the maximum point of the curve of tan δ against temperature.

EXAMPLE 2

50 parts of PPE and 50 parts of a mixture consisting of 34.8 parts of styrene, 3.7 parts of 5-norbornene-2,3-dicarboxyl anhydride (equivalent to 5 mol % on the monomers) and 11.5 parts of a 50/50 w/w mixture of ehtylvinylbenzene and divinylbenzene (equivalent to 10 mol % of divinylbenzene on the monomers) were fed into a mechanical mixer.

The system was mixed under the same conditions as in Example 1. The peroxide (tert-butylperbenzoate) was added as described in Example 1 in a quantity of 1% w/w on the monomers.

The composition and the Tg of the resultant material, determined by DSC, are shown in the accompanying Table 1.

Figure 2:
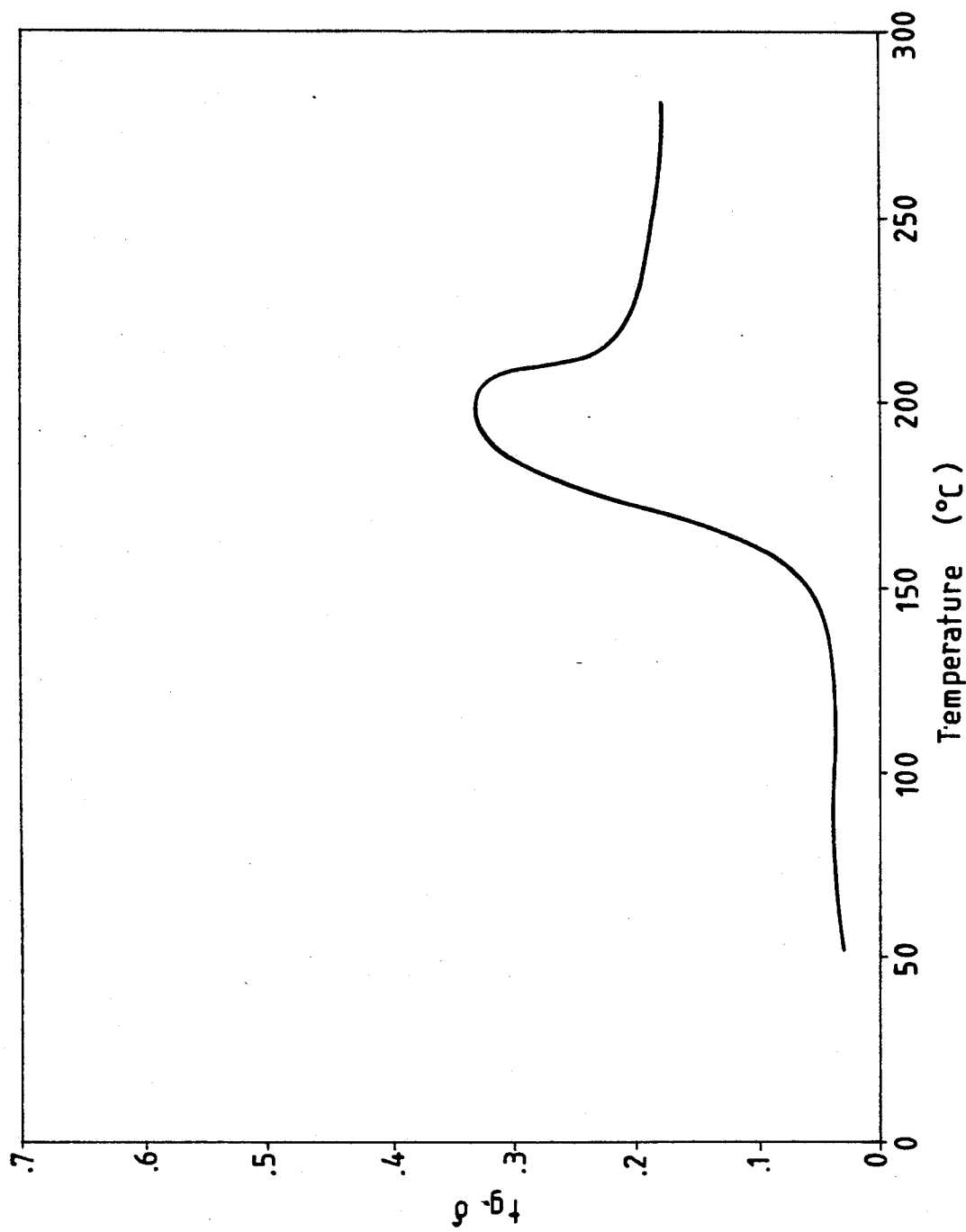

The curve of tan δ against temperature, evaluated by the Rheovibron dynamic-mechanical method (frequency 11 Hz) is shown in FIG. 2.

Table 1 also shows the Tg of the material as evaluated by the Rheovibron dynamic-mechanical method at a frequency of 11 Hz. The Tg is represented by the maximum point of the curve of tan δ against temperature.

EXAMPLE 3

50 parts of PPE and 50 parts of a mixture consisting of 34.6 parts of styrene, 3.8 parts of n-phenylmaleimide (equivalent to 5 mol % on the monomers) and 11.6 parts of a 50/50 w/w mixture of ethylvinylbenzene and divinylbenzene (equivalent to 10 mol % of divinylbenzene on the monomers) were fed into a mechanical mixer. The system was mixed under the same conditions as in Example 1. The peroxide (tert-butylperbenzoate) was added as described in Example 1 in a quantity of 1% w/w on the monomers. The composition and the Tg of the resultant material, determined by DSC, are shown in the accompanying Table 1.

EXAMPLE 4

50 parts of PPE and 50 parts of a mixture consisting of 35.0 parts of styrene, 3.4 parts of 1,2,3,6-tetrahydrophthalic anhydride (equivalent to 5 mol % on the monomers) and 11.6 parts of a 50/50 w/w mixture of ethylvinylbenzene and divinylbenzene (equivalent to 10 mol % of divinylbenzene on the monomers) were fed into a mechanical mixer.

The system was mixed under the same conditions as in Example 1. The peroxide (tert-butylperbenzoate) was added as described in Example 1 in a quantity of 1% w/w on the monomers.

The composition and the Tg of the resultant material, determined by DSC, are shown in the accompanying Table 1.

Figure 3:
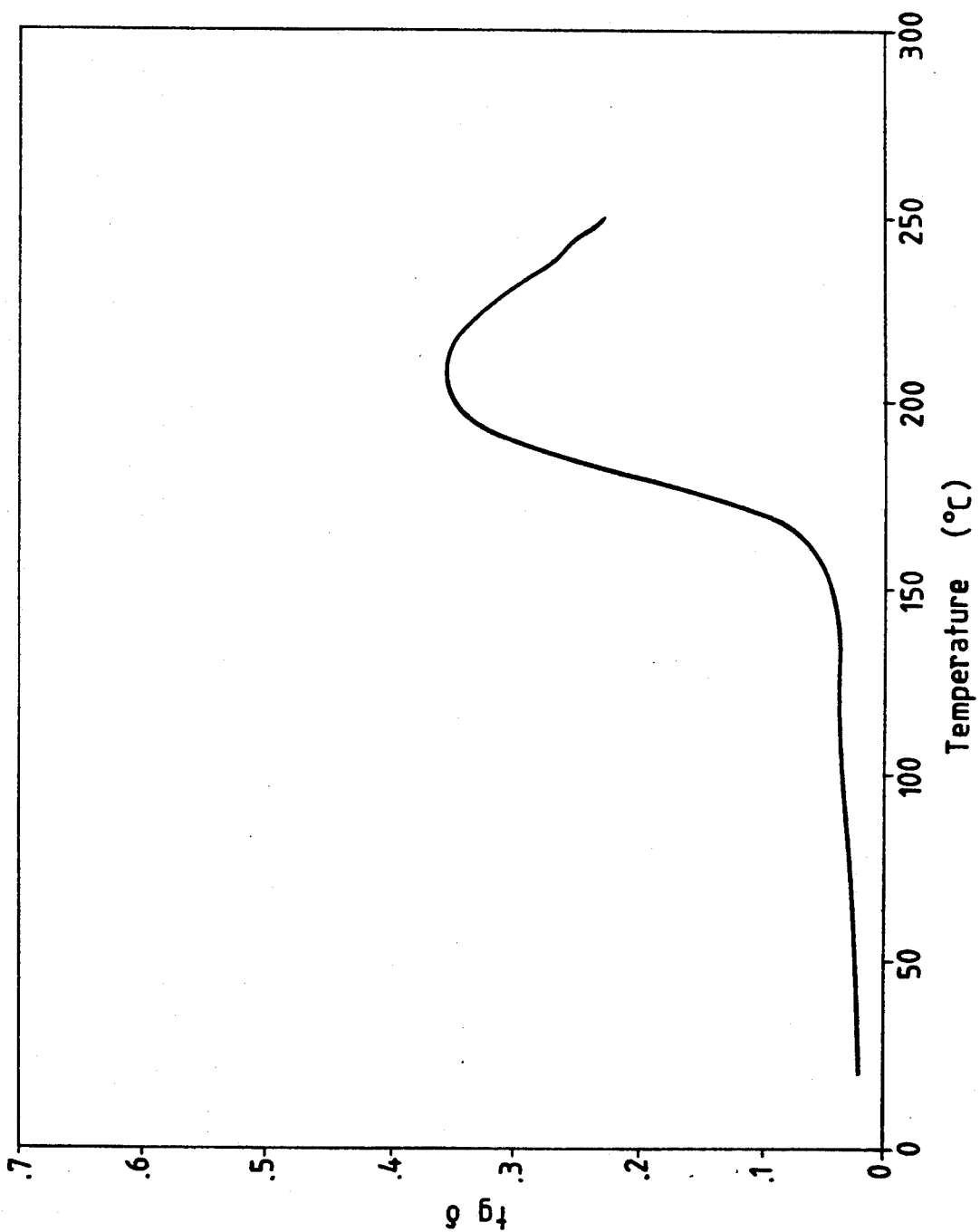

The curve of tan δ against temperature, evaluated by the Rheovibron dynamic-mechanical method (frequency 11 Hz) is shown in FIG. 3.

Table 1 also shows the Tg of the material as evaluated by the Rheovibron dynamic-mechanical method at a frequency of 11 Hz. The Tg is represented by the maximum point of the curve of tan δ against temperature.

EXAMPLE 5

50 parts of PPE and 50 parts of a mixture consisting of 38.2 parts of styrene and 11.8 parts of a 50/50 w/w mixture of ethylvinylbenzene and divinylbenzene (equivalent to 10 mol % of divinylbenzene on the monomers) were fed into a mechanical mixer. The system was mixed under the same conditions as in Example 1. The peroxide (tert-butylperbenzoate) was added in the same manner in a quantity of 1% w/w on the monomers.

Figure 4:
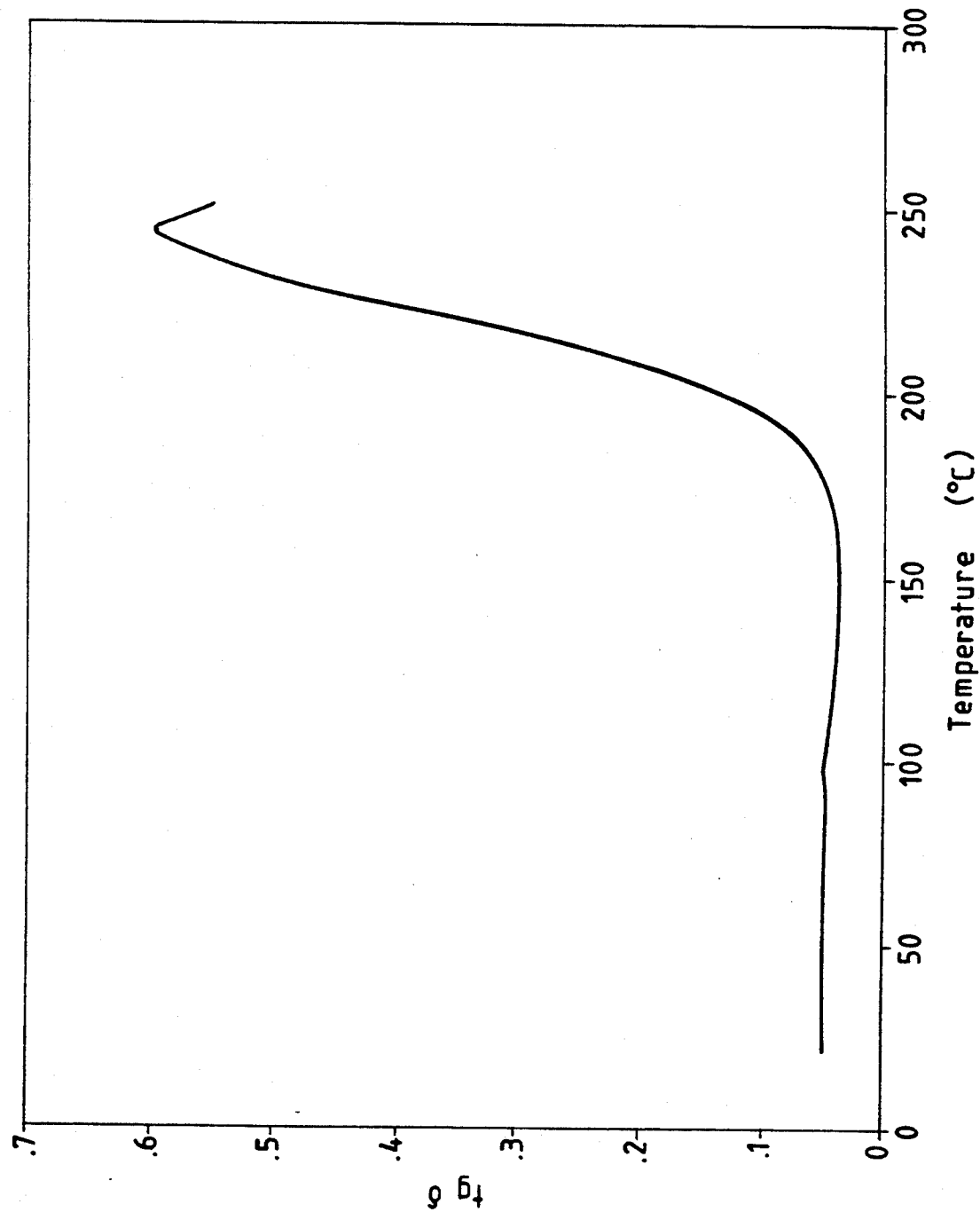

The composition and the Tg of the resultant material, determined by DSC, are shown in the accompanying Table 1. The curve of tan δ against temperature, evaluated by the Rheovibron dynamic-mechanical method (frequency 11 Hz) is shown in FIG. 4.

Table 1 also shows the Tg of the material as evaluated by the Rheovibron dynamic-mechanical method at a frequency of 11 Hz. The Tg is represented by the maximum point of the curve of tan δ against temperature.

EXAMPLE 6

50 parts of PPE and 50 parts of a mixture consisting of 35.0 parts of styrene, 3.2 parts of glycidylmethacrylate (equivalent to 5 mol % on the monomers) and 11.8 parts of a 50/50 w/w mixture of ethylvinylbenzene and divinylbenzene (equivalent to 10 mol % of divinylbenzene on the monomers) were fed into a mechanical mixer.

The system was mixed under the same conditions as in Example 1. The peroxide (tert-butylperbenzoate) was added in the same manner in a quantity of 1% w/w on the monomers.

Figure 5:
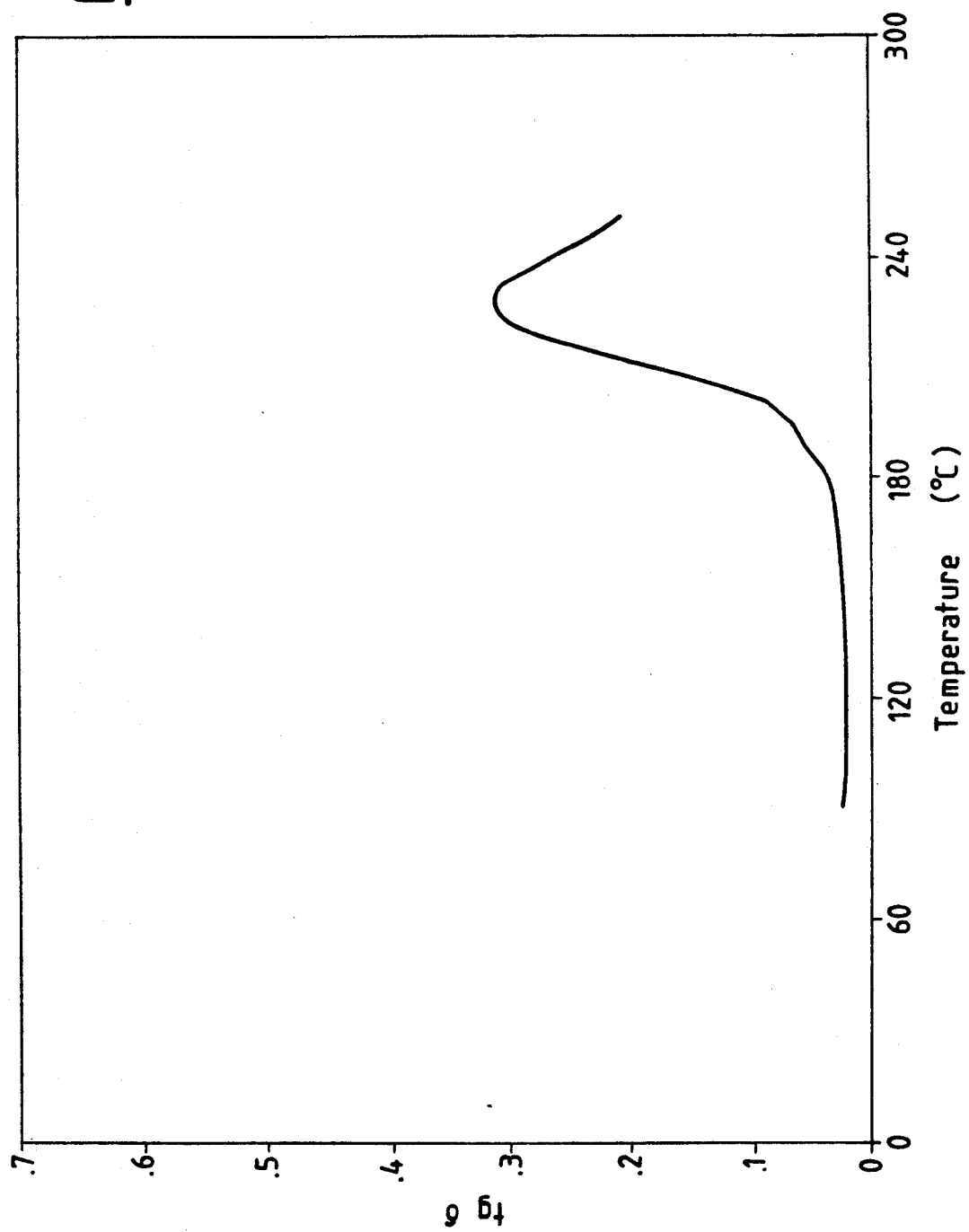

The composition and the Tg of the resultant material, determined by DSC, are shown in the accompanying Table 1. The curve of tan δ against temperature, evaluated by the Rheovibron dynamic-mechanical method (frequency 11 Hz) is shown in FIG. 5.

Table 1 also shows the Tg of the material as evaluated by the Rheovibron dynamic-mechanical method at a frequency of 11 Hz. The Tg is represented by the maximum point of the curve of tan δ against temperature.

EXAMPLE 7

50 parts of PPE and 50 parts of a mixture consisting of 34.6 parts of styrene, 3.9 parts of endo-bicyclo[2,2,2]oct-5-ene-2,3-dicarboxylic anhydride and 11.5 parts of a 50/50 w/w mixture of ethylvinylbenzene and divinylbenzene (equivalent to 10 mol % of divinylbenzene on the monomers) were fed into a mechanical mixer. The system was mixed under the same conditions as in Example 1.

The peroxide (tert-butylperbenzoate) was added in the same manner in a quantity of 1% w/w on the monomers.

The composition and the Tg of the resultant material, determined by DSC, are shown in the accompanying Table 1.

Figure 6:
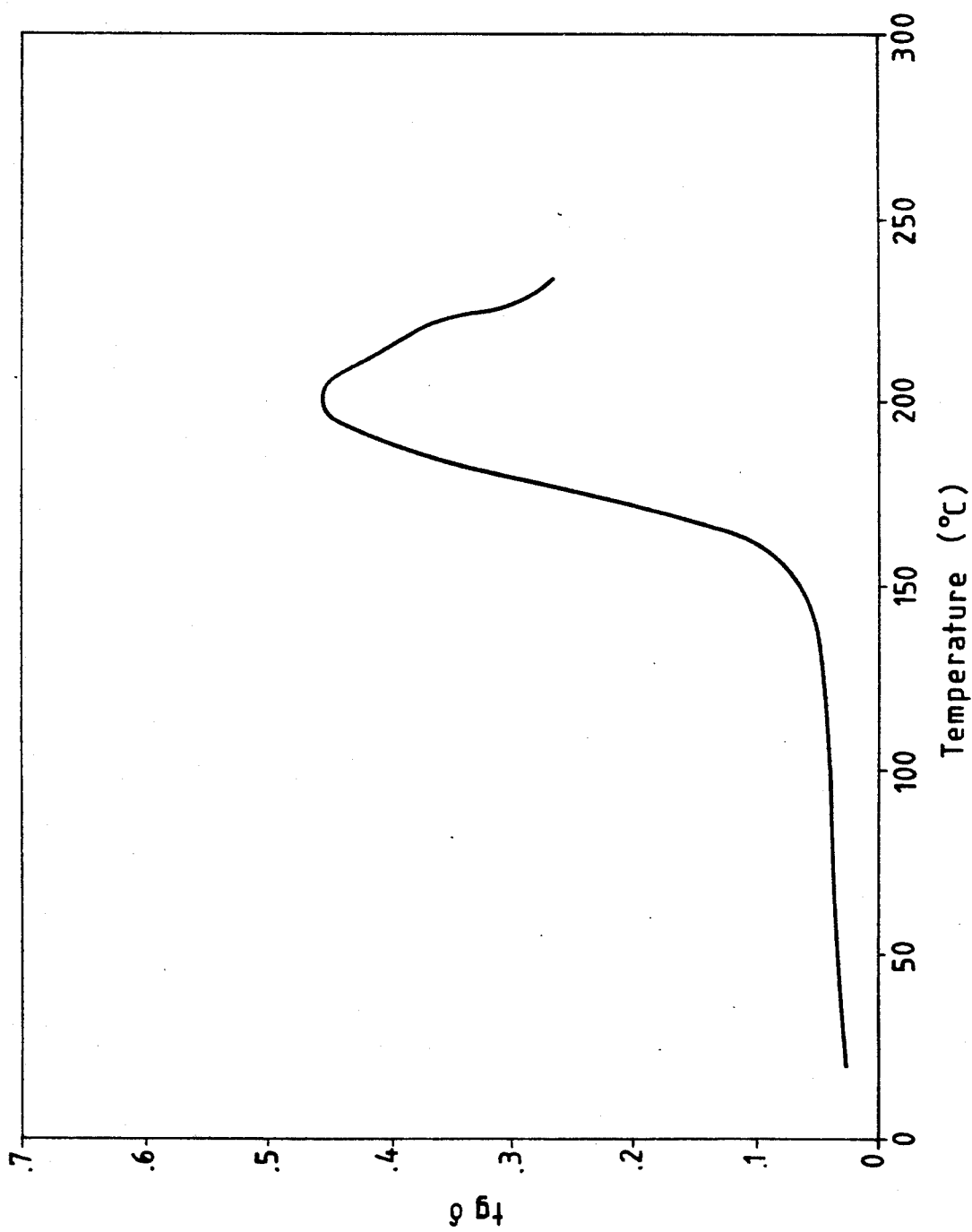

The curve of tan δ against temperature, evaluated by the Rheovibron dynamic-mechanical method (frequency 11 Hz) is shown in FIG. 6.

Table 1 also shows the Tg of the material as evaluated by the
Rheovibron dynamic-mechanical method at a frequency of 11 Hz. The Tg is represented by the maximum point of the curve of tan δ against temperature.

EXAMPLE 8

50 parts of PPE and 50 parts of a mixture consisting of 36.8 parts of styrene and 13.2 parts of trimethylolpropane trimethacrylate (equivalent to 10 mol % of divinylbenzene on the monomers) were fed into a mechanical mixer.

The system was mixed under the same conditions as in Example 1. The peroxide (tert-butylperbenzoate) was added in the same manner in a quantity of 1% w/w on the monomers.

The composition and the Tg of the resultant material, determined by DSC, are shown in the accompanying Table 1.

EXAMPLE 9

50 parts of PPE and 50 parts of a mixture consisting of 27.6 parts of styrene and 22.4 parts of trimethylolpropane trimethacrylate (equivalent to 20 mol % of divinylbenzene on the monomers) were fed into a mechanical mixer.

The system was mixed under the same conditions as in Example 1. The peroxide (tert-butylperbenzoate) was added in the same manner in a quantity of 1% w/w on the monomers.

The composition and the Tg of the resultant material, determined by DSC, are shown in the accompanying Table 1.

EXAMPLE 10 (comparison)

50 parts by weight of PPE and 50 parts of a styrene-/maleic anhydride copolymer (Dylark 132 produced by Arco Chemical) with a maleic anhydride content of 5.3 mol % were fed into a Brabender mechanical mixer. The mixture was melted and kept stirring for 5 minutes (T=280° C.; rotor speed=100 rpm).

The resultant product was cooled in water, dried, finely ground and compression-moulded (P=40 kg/cm$^2$; T=290° C.). The composition and the Tg of the resultant material, determined by DSC, are shown in the accompanying Table 1.

EXAMPLE 11 (comparison)

50 parts of PPE and 50 parts of a mixture consisting of 47.5 parts of styrene and 2.5 parts of maleic anhydride (equivalent to 5 mol % on the monomers) were fed into a Brabender mechanical mixer. The system was mixed under the same conditions as in Example 1. The peroxide (tert-butylperbenzoate) was added as described in Example 1 in a quantity of 1% w/w on the monomers. The composition and the Tg of the resultant material, determined by DSC, are shown in the accompanying Table 1.

EXAMPLE 12 (comparison)

50 parts of PPE and 50 parts of a mixture consisting of 47 parts of styrene and 3.0 parts of glycidylmethacrylate (equivalent to 5 mol % on the monomers) were fed into a mechanical mixer.

The system was mixed under the same conditions as in Example 1.

The peroxide (tert-butylperbenzoate) was added as described in Example 1 in a quantity of 1% w/w on the monomers.

The composition and the Tg of the resultant material, determined by DSC, are shown in the accompanying Table 1.

TABLE 1

| COMPONENTS | | EX.1 | EX.2 | EX.3 | EX.4 |
|---|---|---|---|---|---|
| PPE (parts by weight) | | 50 | 50 | 50 | 50 |
| 1 | Monomers (parts by weight): | | | | |
| 2 | Styrene | 37.2 | 34.8 | 34.6 | 35.0 |
| 3 | EVB + DVB (1) | 11.8 | 11.5 | 11.6 | 11.6 |
| 4 | AM | 1.0 | | | |
| 5 | NBA | | 3.7 | | |
| 6 | NPMI | | | 3.8 | |
| 7 | THPA | | | | 3.4 |
| 8 | TMPTMA | | | | |
| 9 | EBODA | | | | |
| 10 | GMA | | | | |
| | SMA | | | | |
| Initiator (parts by weight) (2): | | | | | |
| TBPB | | 1 | 1 | 1 | 1 |
| tg (DSC) (°C.) (3) | | 194 | 179 | 186 | 187 |
| tg (Rheovibron) (°C.) | | 230 | 190 | | 204 |
| COMPONENTS | | EX. 5 | EX. 6 | EX. 7 | EX. 8 |
| PPE (parts by weight) | | 50 | 50 | 50 | 50 |
| 1 | Monomers (parts by weight): | | | | |
| 2 | Styrene | 38.2 | 35.0 | 34.6 | 36.8 |
| 3 | EVB + DVB (1) | 11.8 | 11.8 | 11.5 | |
| 4 | AM | | | | |
| 5 | NBA | | | | |
| 6 | NPMI | | | | |
| 7 | THPA | | | | |
| 8 | TMPTMA | | | | 13.2 |
| 9 | EBODA | | | 3.9 | |
| 10 | GMA | | 3.2 | | |
| | SMA | | | | |
| Initiator (parts by weight) (2): | | | | | |
| TBPB | | 1 | 1 | 1 | 1 |
| tg (DSC) (°C.) (3) | | 198 | 185 | 198 | 190 |
| tg (Rheovibron) (°C.) | | 240 | 234 | 198 | |
| COMPONENTS | | EX. 9 | EX. 10 | EX. 11 | EX. 12 |
| PPE (parts by weight) | | 50 | 50 | 50 | 50 |
| 1 | Monomers (parts by (weight): | | | | |
| 2 | Styrene | 27.6 | | 47.5 | 47 |
| 3 | EVB + DVB (1) | | | | |
| 4 | AM | | | 2.5 | |
| 5 | NBA | | | | |
| 6 | NPMI | | | | |
| 7 | THPA | | | | |
| 8 | TMPTMA | 22.4 | | | |
| 9 | EBODA | | | | |
| 10 | GMA | | | | 3.0 |
| | SMA | | 50 | | |
| Initiator (parts by weight) (2): | | | | | |
| TBPB | | 1 | | 1 | 1 |
| tg (DSC) (°C.) (3) | | 196 | 145 | 149 | 148 |
| tg (Rheovibron) (°C.) | | | | | |

Observations:
PPE = poly(2,6-dimethyl-1,4-phenylene ether);
EVB = ethylvinylbenzene; DVB = divinylbenzene;
AM = maleic anhydride; NBA = 5-norbornene-2,3-dicarboxyl anhydride;
NPMI = N-phenylmaleimide;
THPA = 1,2,3,6-tetrahydrophthalic anhydride;
TMPTMA = trimethylolpropane trimethacrylate;
EBODA = endobicyclo(2,2,2)oct-5-ene-2,3-dicarboxylic anhydride;
GMA = glycidylmethacrylate; SMA = styrene/maleic anhydride copolymer; TBPB = tert-butylperbenzoate
NB:
(1) EVB/DVB mixture (1:1 by weight)
(2) parts by weight referred to monomers alone
(3) 2 by scanning (10° C./min from 50° C. to 300° C.)

EXAMPLE 13

10 parts (meaning parts by weight throughout the examples) of polybutadiene and 45 parts of a mixture consisting of 34.4 parts of styrene monomer and 10.6 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 45 parts of poly(2,6-dimethyl-1,4-phenyleneoxide) having an intrinsic viscosity of 0.54 dl/g (known as PPE in the following examples) were then added.

At this point the mixture was loaded into a mechanical mixer, a stirring rate of 20 rpm being maintained during loading. The rate was then raised to 80 rpm for 10 minutes, maintaining the temperature below 60° C.

The product of this mixing was then subjected to reactive moulding in a compression press, under the following conditions:
a) isothermal at 110° C. for 15 minutes
b) increase from 110° to 140° C. (rate 3° C./min)
c) isothermal at 140° C. for 10 minutes;
d) rise from 140° to 200° C. (rate 3° C./min)
e) isothermal at 200° C. for 15 minutes f) fall from 200° to 80° C. in 15 minutes The applied pressure was 20 kg/cm$^2$ The composition is given in parts by weight in Table 2.

The glass transition temperatures determined by DSC analysis are given in Table 3.

The Izod impact strength with notched specimen (D256) is given in Table 3.

Figure 7:
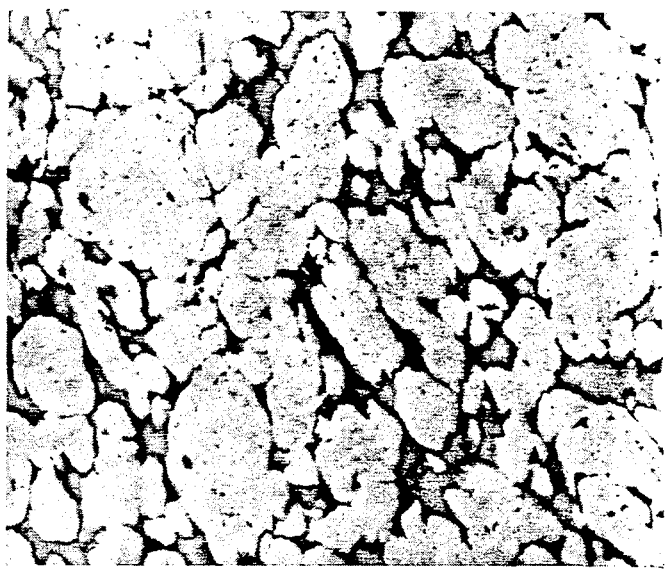

The morphology of the system can be seen from the TEM micrograph of FIG. 7 ($\times$21,000).

Table 4 shows the VICAT value (ASTM D1525; v=50° C./h) for this and the following examples.

EXAMPLE 14

20 parts of polybutadiene and 40 parts of a mixture consisting of 30.6 parts of styrene monomer and 9.4 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 40 parts of PPE having an intrinsic viscosity of 0.54 dl/g were then added.

The system was then mixed and moulded under the conditions indicated in Example 13.

The composition is given in parts by weight in Table 2.

The glass transition temperatures determined by DSC analysis are given in Table 3.

The Izod impact strength with notched specimen (D256) is given in Table 3.

Figure 8:
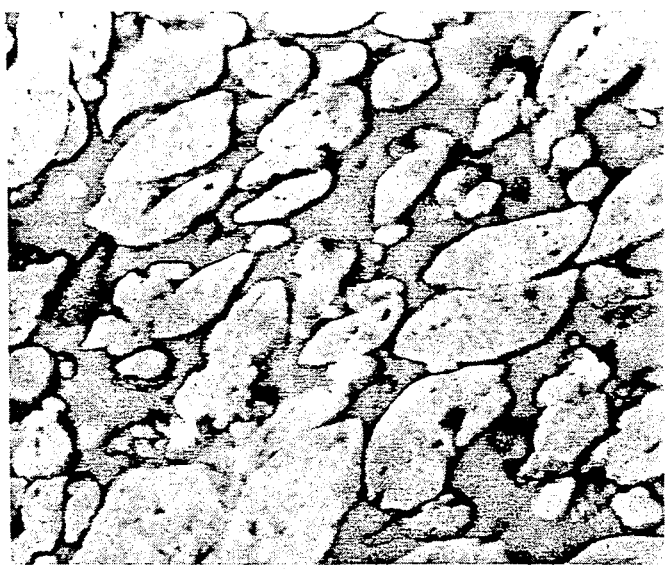

The morphology of the system can be seen from FIG. 8, which shows a TEM micrograph ($\times$21,000).

EXAMPLE 15

10 parts of a linear three-block styrene-butadiene-styrene copolymer and 45 parts of a mixture consisting of 34.4 parts of styrene monomer and 10.6 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 45 parts of PPE having an intrinsic viscosity of 0.54 dl/g were then added.

The system was then mixed and moulded under the conditions indicated in Example 13.

The composition is given in parts by weight in Table 2.

The glass transition temperatures determined by DSC analysis are given in Table 3.

The Izod impact strength with notched specimen (D256) is given in Table 3.

Figure 9:
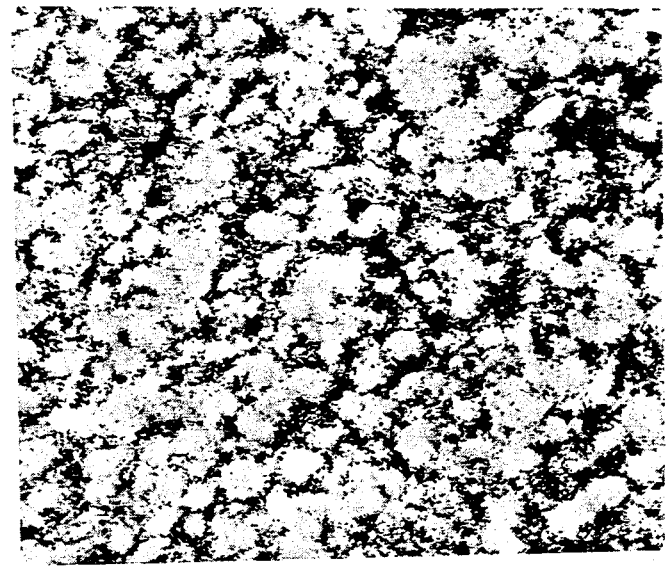

The morphology of the obtained system can be seen from FIG. 9, which shows a TEM micrograph ($\times$21,000).

Table 5 shows for this and the following examples the Tg values obtained by dynamic mechanical analysis.

Table 6 shows the flexural modulus values.

EXAMPLE 16

20 parts of a linear three-block styrene-butadiene-styrene copolymer and 40 parts of a mixture consisting of 30.6 parts of styrene monomer and 9.4 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 40 parts of PPE having an intrinsic viscosity of 0.54 dl/g were then added.

The system was then mixed and moulded under the conditions indicated in Example 13.

The composition is given in parts by weight in Table 2.

The glass transition temperatures determined by DSC analysis are given in Table 3.

The Izod impact strength with notched specimen (D256) is given in Table 3.

Figure 10:
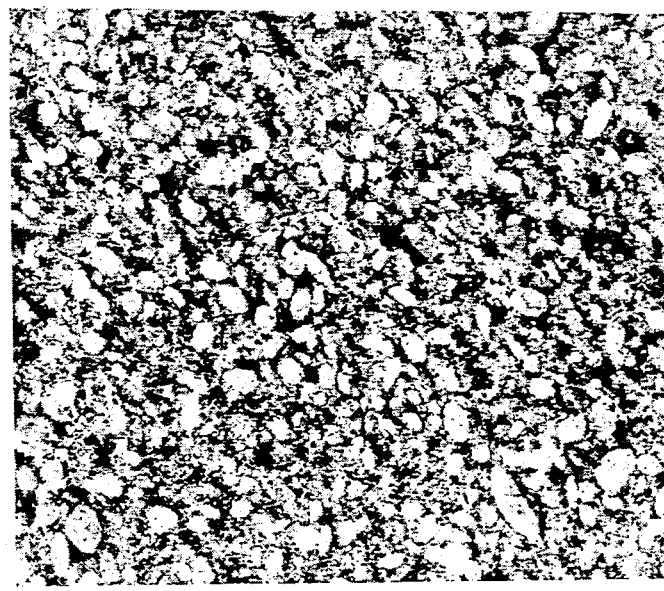

The morphology of the specimen can be seen from FIG. 10, which shows a TEM micrograph ($\times$21,000).

EXAMPLE 17

10 parts of a star styrene-butadiene-styrene copolymer and 45 parts of a mixture consisting of 34.4 parts of styrene monomer and 10.6 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 45 parts of PPE having an intrinsic viscosity of 0.54 dl/g were then added.

The system was then mixed and moulded under the conditions indicated in Example 13.

The composition is given in parts by weight in Table 2. The glass transition temperatures determined by DSC analysis are given in Table 3.

The Izod impact strength with notched specimen (D256) is given in Table 3.

Figure 11:
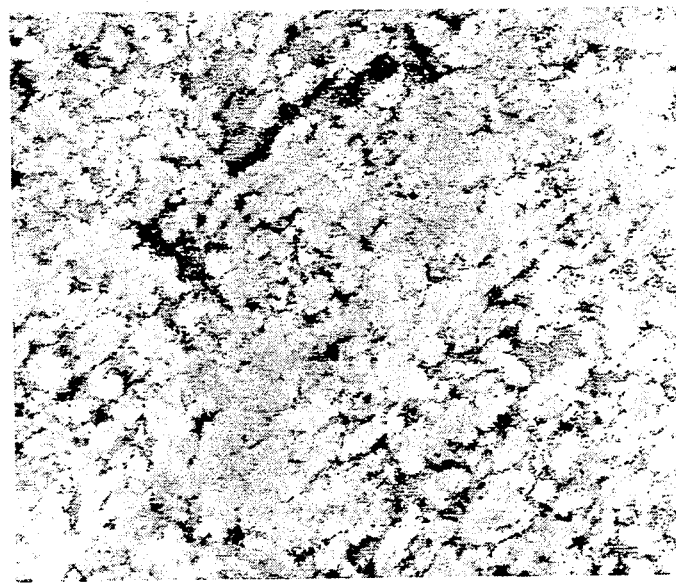

The morphology of the obtained system can be seen from FIG. 11, which shows a TEM micrograph ($\times$21,000).

EXAMPLE 18

20 parts of a star linear styrene-butadiene-styrene copolymer and 40 parts of a mixture consisting of 30.6 parts of styrene monomer and 9.4 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 40 parts of PPE having an intrinsic viscosity of 0.54 dl/g were then added.

The system was then mixed and moulded under the conditions indicated in Example 13.

The composition is given in parts by weight in Table 2.

The glass transition temperatures determined by DSC analysis are given in Table 3.

The Izod impact strength with notched specimen (D256) is given in Table 3.

Figure 12:
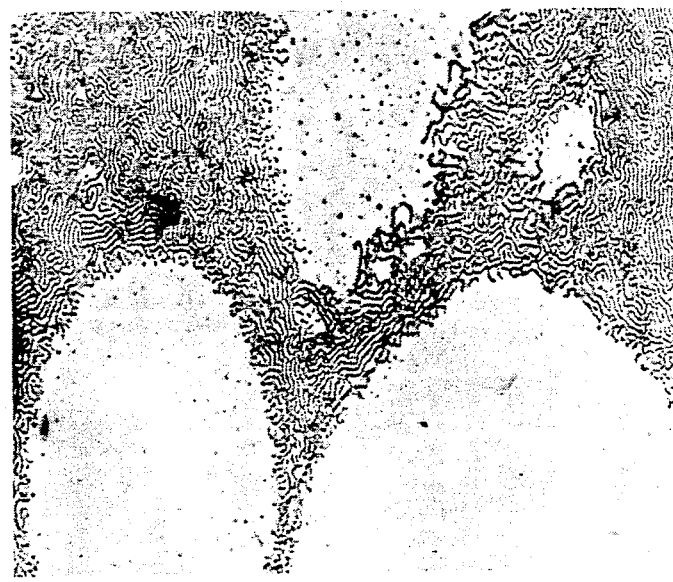

The morphology of the specimen can be seen from FIG. 12, which shows a TEM micrograph ($\times$21,000).

EXAMPLE 19

10 parts of a mixture consisting of 5 parts of polybutadiene and 5 parts of linear styrene-butadiene-styrene copolymer, and 45 parts of a mixture consisting of 34.4 parts of styrene monomer and 10.6 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 45 parts of PPE having an intrinsic viscosity of 0.54 dl/g were then added.

The system was then mixed and moulded under the conditions indicated in Example 13.

The composition is given in parts by weight in Table 2. The glass transition temperatures determined by DSC analysis are given in Table 3.

The Izod impact strength with notched specimen (D256) is given in Table 3.

Figure 13:
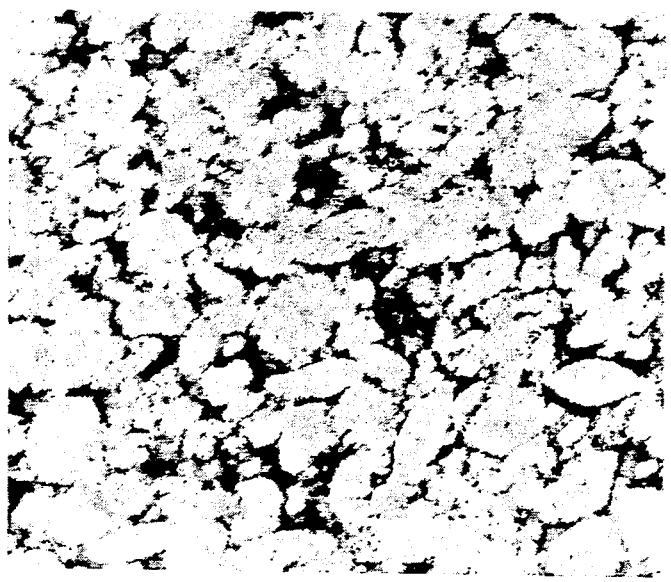

The morphology of the obtained system can be seen from FIG. 13, which shows a TEM micrograph (×21,000).

EXAMPLE 20

10 parts of a mixture consisting of 7.5 parts of polybutadiene and 2.5 parts of linear styrene-butadiene-styrene copolymer, and 45 parts of a mixture consisting of 34.4 parts of styrene monomer and 10.6 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 45 parts of PPE having an intrinsic viscosity of 0.54 dl/g were then added.

The system was then mixed and moulded under the conditions indicated in Example 13.

The composition is given in parts by weight in Table 2.

The glass transition temperatures determined by DSC analysis are given in Table 3.

The Izod impact strength with notched specimen (D256) is given in Table 3.

Figure 14:
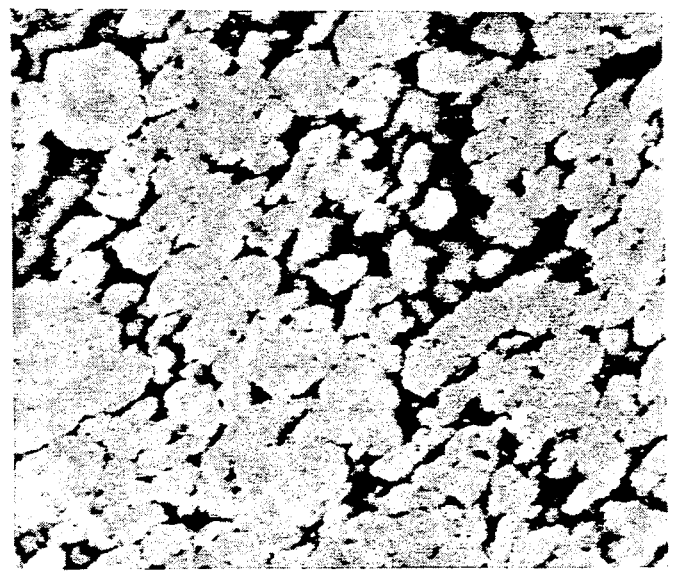

The morphology of the obtained system can be seen from FIG. 14, which shows a TEM micrograph (×21,000).

EXAMPLE 21

10 parts of a mixture consisting of 2.5 parts of polybutadiene and 7.5 parts of linear styrene-butadiene-styrene copolymer, and 45 parts of a mixture consisting of 34.4 parts of styrene monomer and 10.6 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 45 parts of PPE having an intrinsic viscosity of 0.54 dl/g were then added.

The system was then mixed and moulded under the conditions indicated in Example 13.

The composition is given in parts by weight in Table 2.

The glass transition temperatures determined by DSC analysis are given in Table 3.

The Izod impact strength with notched specimen (D256) is given in Table 3.

Figure 15:
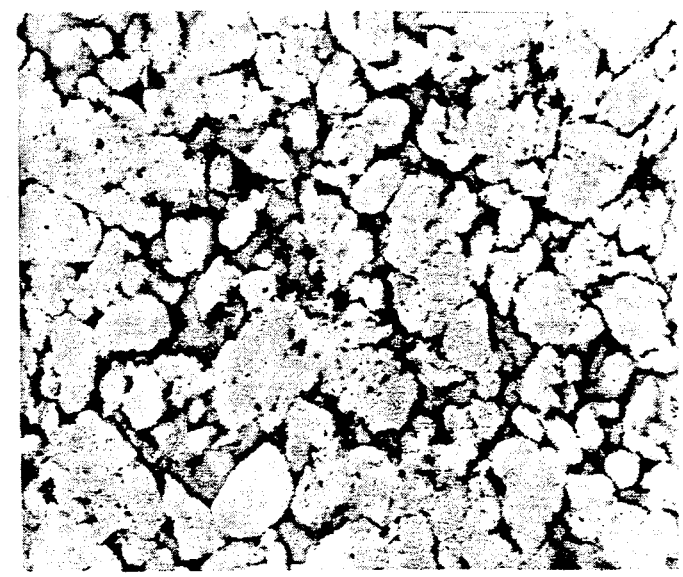

The morphology of the obtained system can be seen from FIG. 15, which shows a TEM micrograph (×21,000).

EXAMPLE 22

20 parts of a mixture consisting of 10 parts of polybutadiene and 10 parts of a linear styrene-butadiene-styrene copolymer, and 40 parts of a mixture consisting of 30.6 parts of styrene monomer and 9.4 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 40 parts of PPE having an intrinsic viscosity of 0.54 dl/g were then added.

The system was then mixed and moulded under the conditions indicated in Example 13.

The composition is given in parts by weight in Table 2.

The glass transition temperatures determined by DSC analysis are given in Table 3.

The Izod impact strength with notched specimen (D256) is given in Table 3.

Figure 16:
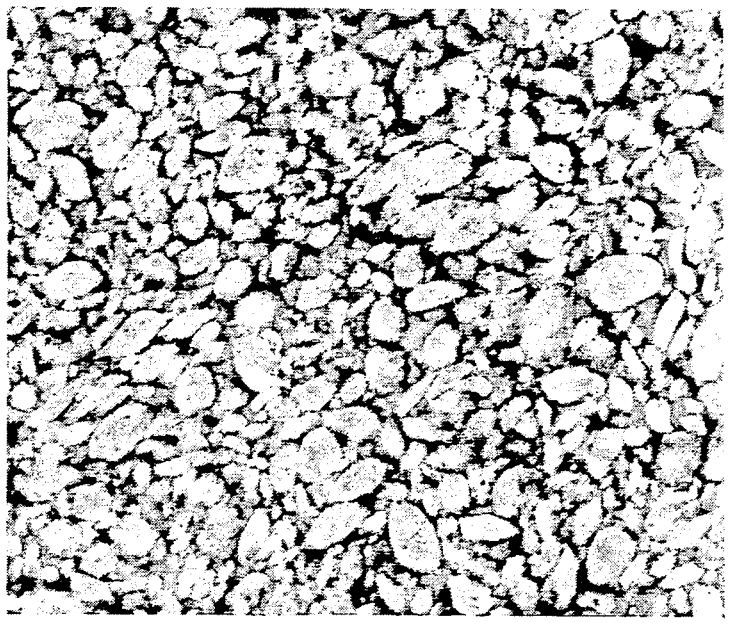

The morphology of the specimen can be seen from FIG. 16, which shows a TEM micrograph (×21,000).

EXAMPLE 23

20 parts of a mixture consisting of 15 parts of polybutadiene and 5 parts of a linear styrene-butadiene-styrene copolymer, and 40 parts of a mixture consisting of 30.6 parts of styrene monomer and 9.4 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 40 parts of PPE having an intrinsic viscosity of 0.54 dl/g were then added.

The system was then mixed and moulded under the conditions indicated in Example 13.

The composition is given in parts by weight in Table 2.

The glass transition temperatures determined by DSC analysis are given in Table 3.

The Izod impact strength with notched specimen (D256) is given in Table 3.

Figure 17:
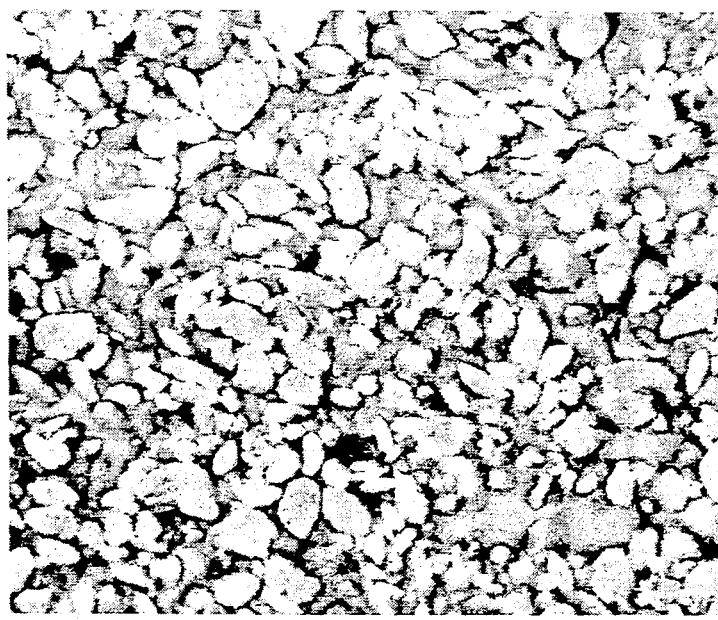

The morphology of the specimen can be seen from FIG. 17, which shows a TEM micrograph (×21,000).

EXAMPLE 24

50 parts of a mixture consisting of 38.3 parts of styrene monomer and 11.7 parts of a 50/50 w/w mixture of ethylvinylbenzene and divinylbenzene (equivalent to 10 mol % of divinylbenzene on the monomers) were fed into a flask. A quantity of tert-butylperbenzoate equivalent to 1% w/w on the final composition was then added.

The mixture prepared in this manner was left for 12 hours at 0° C. 50 parts of PPE having an intrinsic viscosity of 0.54 dl/g were then added.

The system was then mixed and moulded under the conditions indicated in Example 1.

The composition is given in parts by weight in Table 2. The glass transition temperatures determined by DSC analysis are given in Table 3.

The Izod impact strength with notched specimen (D256) is given in Table 3.

TABLE 2

MIXTURE COMPOSITION

| EXAMPLE | PPE | STY-DVB | TBPB | PBTD | SBS L | SBS S |
|---|---|---|---|---|---|---|
| 13 | 45 | 45 | 1 | 10 | — | — |
| 14 | 40 | 40 | 1 | 20 | — | — |
| 15 | 45 | 45 | 1 | — | 10 | — |
| 16 | 40 | 40 | 1 | — | 20 | — |
| 17 | 45 | 45 | 1 | — | — | 10 |
| 18 | 40 | 40 | 1 | — | — | 20 |
| 19 | 45 | 45 | 1 | 5 | 5 | — |
| 20 | 45 | 45 | 1 | 7.5 | 2.5 | — |
| 21 | 45 | 45 | 1 | 2.5 | 7.5 | — |
| 22 | 40 | 40 | 1 | 10 | 10 | — |
| 23 | 40 | 40 | 1 | 15 | 5 | — |
| 24 | 50 | 50 | 1 | — | — | — |

STY-DVB mixture of styrene and divinylbenzene
TBPB tert-butylperbenzoate
PBTD polybutadiene
SBS L styrene-butadiene-styrene linear copolymer
SBS S styrene butadiene-styrene star copolymer

TABLE 3

| EXAMPLE | GLASS TRANSITION (°C.) | | IZOD (J/m) |
|---|---|---|---|
| 13 | −87 | 175 | 34.89 |
| 14 | −85 | 190 | 57.82 |
| 15 | n.d. | 170 | 34.57 |
| 16 | −85 | 175 | 58.79 |
| 17 | n.d. | 180 | 33.03 |
| 18 | n.d. | 175 | 88.34 |
| 19 | n.d. | 180 | 34.75 |
| 20 | n.d. | 185 | 30.96 |
| 21 | −85 | 182 | 33.7 |
| 22 | −85 | 185 | 69.36 |
| 23 | −84 | 187 | 59.16 |
| 24 | — | — | 23.96 |

TABLE 4

VICAT ASTM D 1525

| EXAMPLE No. | PB % | SBS 166 % | SBS 163 % | Temperature °C. | SDV |
|---|---|---|---|---|---|
| 13 | 10 | — | — | max. temp | — |
| 14 | 20 | — | — | 169.53 | 4.72 |
| 15 | — | 10 | — | 166.73 | 2.42 |
| 16 | — | 20 | — | 170.08 | 0.58 |
| 17 | — | — | 10 | 175.2 | 4.66 |
| 18 | — | — | 20 | 148.58 | 0.88 |
| 19 | 5 | 5 | — | 170.4 | 3.25 |
| 20 | 7.5 | 2.5 | — | 179.95 | 13.1 |
| 21 | 2.5 | 7.5 | — | 174.38 | 1.83 |
| 22 | 10 | 10 | — | 174.53 | 0.63 |
| 23 | 15 | 5 | — | max. temp | — |

Rate: 50° C./hour

TABLE 5

PPE -IPN Tg VALUES DETERMINED BY DMTA

| EXAMPLE No. | PB % | SBS 166 % | SBS 163 % | Tg elastomer 1 Hz °C. | Tg elastomer 10 Hz °C. | Tg engineering polymer 1 Hz °C. | Tg engineering polymer 10 Hz °C. |
|---|---|---|---|---|---|---|---|
| 15 | — | 10 | — | −70.5 | −65.5 | 180 | 188 |
| 16 | — | 20 | — | −74 | −70.5 | 186.5 | 195.5 |
| 18 | — | — | 20 | −69.5 | −66 | 182 | 188.5 |
| 19 | 5 | 5 | — | −72.5 | −68.5 | 186 | 195.5 |
| 20 | 7.5 | 2.5 | — | −73 | −69.5 | 192 | 201 |
| 21 | 2.5 | 7.5 | — | −73.5 | −69 | 181.5 | 190.5 |
| 22 | 10 | 10 | — | −72.5 | −69 | 193.5 | 202.5 |
| 23 | 15 | 5 | — | −70.5 | −67 | 195 | 204 |

TABLE 6

PPE -IPN FLEXURAL MODULUS VALUES

| EXAMPLE No. | PB % | SBS 166 % | SBS 163 % | MODULUS MPa | SDV |
|---|---|---|---|---|---|
| 15 | — | 10 | — | 2518 | 4 |
| 16 | — | 20 | — | 1832 | — |
| 17 | — | — | 10 | 2424 | — |
| 18 | — | — | 20 | 1509 | — |
| 19 | 5 | 5 | — | 2059* | 73 |
| 20 | 7.5 | 2.5 | — | 1769 | — |
| 21 | 2.5 | 7.5 | — | 1870 | 28 |
| 22 | 10 | 10 | — | 1266 | — |
| 23 | 15 | 5 | — | 1014 | — |

We claim:

1. Toughenable polymer compositions cross-linkable thermally or by the effect of ultraviolet radiation, comprising:
   a) from 10 to 90% by weight of at least one polyphenylene ether;
   b) from 10 to 90% by weight of a mixture of monounsaturated monomers consisting essentially of:
   b1) from 1 to 97.73% by weight of at least one mono-unsaturated vinylaromatic monomer chosen from those of general formula:

$$\underset{\underset{(Q)_m}{\bigcirc}}{\overset{R_1}{\underset{|}{C}}=CH_2} \quad (IV)$$

where $R_1$ is hydrogen or a $C_1$-$C_4$ linear alkyl radical; Q is hydrogen, a halogen, a linear or branched $C_1$-$C_4$ radical or —$OCH_3$; m is a whole number between 1 and 5;
   b2) from 0 to 96.73% by weight of at least one monomer containing vinyl group unsaturations:
   b3) from 2.27 to 8.6% by weight of at least one cyclic anhydride or at least one cyclic dianhydride containing unsaturations able to (co)polymerize radically with the monomers b1 and b2;
   b4) from 0 to 96.73% by weight of an unsaturated compound deriving from the reaction between an unsaturated cyclic dianhydride and a co-reactant selected from the group consisting of an alcohol, ammonia, a primary amine, a secondary amine, and water;
   c) from 1 to 80% by weight of a polyunsaturated monomer; and
   d) from 0.01 to 10% of one or more generators of radicals able to promote the thermal and/or U.V. polymerization of the monomers of components b and c, based on 100% of a–d.

2. A polymer composition as claimed in claim 1, characterised in that the polyphenylene ether is poly(2,6-dimethyl-1,4-phenylene ether).

3. A polymer composition as claimed in claim 1, characterised in that the mono-unsaturated vinylaromatic monomer is styrene.

4. A polymer composition as claimed in claim 1, characterised in that the vinyl groups are chosen from the group consisting of vinylacetate, vinyl pivalate, vinyl propionate, vinyl versatate and vinyl pyrrolidone.

5. A polymer composition as claimed in claim 1, characterised in that the unsaturated cyclic anhydride is cis-5-norbornene-endo-2,3-dicarboxylic anhydride.

6. A polymer composition as claimed in claim 1, characterised in that unsaturated cyclic anhydride is cis-1,2,3,6-tetrahydrophthalic anhydride.

7. A polymer composition as claimed in claim 1, characterised in that the unsaturated cyclic anhydride is bicyclo[2,2,2]oct-7-ene-2,3,5,6-tetracarboxylic dianhydride.

8. A polymer composition as claimed in claim 1, characterised in that the unsaturated cyclic anhydride is endo-bicyclo[2,2,2]oct-5-ene-2,3-dicarboxylic anhydride.

9. A polymer composition as claimed in claim 1, characterised in that the unsaturated cyclic anhydride is maleic anhydride.

10. A polymer composition as claimed in claim 1, characterised in that the unsaturated anhydride is vinylphthalic anhydride.

11. A polymer composition as claimed in claim 1, characterised in that the unsaturated cyclic anhydride derivatives are selected from the group consisting of diethylmaleate, monoethyl maleate, maleimide and phenylmaleimide.

12. A polymer composition as claimed in claim 1, characterised in that the polyunsaturated monomer is a polyunsaturated vinylaromatic compound corresponding to the general formula:

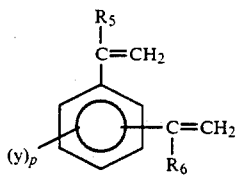

(XII)

where y is hydrogen, a halogen, a linear or branched $C_1$–$C_4$ alkyl, —$OCH_3$ or

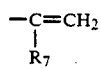

$R_5$, $R_6$, $R_7$ represent, independently of each other, hydrogen or a $C_1$–$C_4$ alkyl radical; and p is a whole number between 1 and 4.

13. A polymer composition as claimed in claim 12, characterised in that the polyunsaturated vinylaromatic compound is divinylbenzene.

14. A polymer composition as claimed in claim 12, characterised in that the vinylaromatic compound is trivinylbenzene.

15. A polymer composition as claimed in claim 1, characterised in that the polyunsaturated monomer is a polyacrylate corresponding to the general formula:

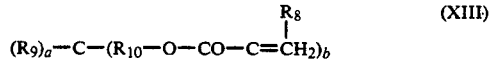

(XIII)

where $R_8$ represents a hydrogen atom or a methyl radical; $R_9$ represents a hydrogen atom or a linear or branched $C_1$–$C_{10}$ alkyl radical; $R_{10}$ represents a $C_1$–$C_3$ linear alkyl biradical; a and b are two whole numbers such that $a+b=4$ and $b \geq 2$.

16. A polymer composition as claimed in claim 15, characterised in that the polyacrylate pertains to the group comprising pentaerythritol tetraacrylate, pentaerythritol tetramethacrylate, 1,1,1-trimethylolpropane triacrylate, 1,1,1-trimethylolpropane trimethacrylate.

17. A polymer composition as claimed in claim 1, characterised in that the polyunsaturated monomer is a polymaleimide corresponding to the general formula:

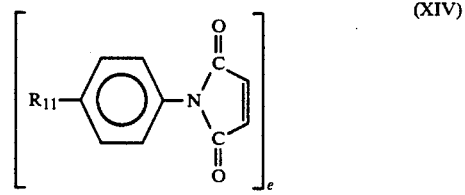

(XIV)

where $R_{11}$ represents an aliphatic, aromatic or alkylaromatic multiple radical and e is a whole number $\geq 2$.

18. A polymer composition as claimed in claim 17, characterised in that the polyphenylmaleimide is the bismaleimide corresponding to the formula:

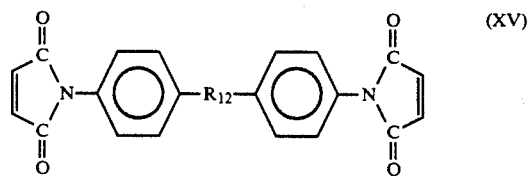

(XV)

where $R_{12}$ is a $C_1$–$C_{12}$ linear or branched aliphatic or cycloaliphatic biradical.

19. A polymer composition as claimed in claim 1 further comprising as a component (e) from 1 to 30% by weight of a copolymer of elastomeric character.

20. A polymer composition as claimed in claim 19, characterised in that the elastomeric (co)polymer is selected from the group consisting of: polybutadiene, polyisoprene, styrene-diene copolymer, acrylic rubber, nitrile rubber, butyl rubber, copolymers and terpolymers of alphaolefins (EPDM, EPR), and styrene-ethylene-butene copolymers.

21. A polymer composition as claimed in claim 19 further comprising a component (f) selected from the group consisting of additives, accelerators, stabilizers, and flame retardants.

22. A polymer composition as claimed in claim 21, characterised by being prepared by totally or partially dissolving the polyphenylene ether (component a) in the mixture of components b and c, and then adding the components d and e and the additives component.

23. A polymer composition as claimed in claim 21, characterised by comprising one or more of the following constituents as component (f): radical polymerization accelerator, filler, glass fibres, carbon fibres, metal shavings, natural or synthetic fibre fabric, stabilizer, plasticizer, dye, antistatic agent, flame resistant agent.

24. Toughenable polymer compositions cross-linkable thermally or by the effect of ultraviolet radiation comprising:
(a) from 10 to 90% by weight of polyphenylene ether comprised of poly(2,6-dimethyl-1,4-phenylene ether);
(b) from 10 to 90% by weight of a mixture of monounsaturated monomers consisting essentially of:

(i) from 1 to 97.73% by weight of at least one mono-unsaturated vinyl aromatic monomer comprised of styrene;

(ii) from 0 to 96.73% by weight of at least one monomer containing vinyl unsaturations selected from the group consisting of vinyl acetate, vinyl pivalate, vinyl propionate, vinyl versatate and vinyl pyrrolidone;

(iii) from 2.27 to 8.6% by weight of at least one cyclic anhydride selected from the group consisting of cis-5-norbornene-endo-2,3-dicarboxylic anhydride, cis-1,2,3,6-tetrahydrophthalic anhydride, bicyclo[2,2,2]oct-7-ene-2,3,5,6-tetracarboxylic dianhydride, endo-bicyclo[2,2,2]oct-5-ene-2,3-dicarboxylic anhydride, maleic anhydride and vinylphthalic anhydride;

(iv) from 0 to 96.73% by weight of a unsaturated compound selected from the group consisting of diethylmaleate, monoethylmaleate, maleamide and phenylmaleimide;

(c) from 1 to 80% by weight of a polyunsaturated monomer selected from the group consisting of divinylbenzene, trivinylbenzene, pentaerythritol tetraacrylate, pentaerythritol tetramethacrylate, 1,1,1-trimethylolpropane triacylate, 1,1,1-trimethylolpropane trimethacrylate, and bismaleimide having the following formula:

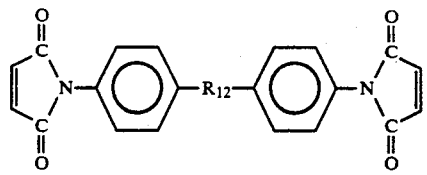

where $R_{12}$ is a $C_1$–$C_{12}$ linear or branched aliphatic or cycloaliphatic biradical; and (d) from 0.01 to 10% by weight of one or more generators of radicals able to promote the thermal and/or U.V. polymerization of the monomers of components (b) and (c) based on 100% of a–d.

* * * * *